United States Patent [19]

Kostka et al.

[11] 4,078,887
[45] Mar. 14, 1978

[54] CONCENTRATED STABLE SOLUTIONS OF COUPLING COMPONENTS FOR THE ICE COLOR DYEING, THEIR PREPARATION AND USE

[75] Inventors: Rudolf Kostka; Hasso Hertel, both of Muhlheim am (Main), Germany

[73] Assignee: Hoechst Aktiengesellschaft, Frankfurt am Main, Germany

[21] Appl. No.: 744,141

[22] Filed: Nov. 22, 1976

[30] Foreign Application Priority Data

Nov. 25, 1975 Germany ............... 2552717

[51] Int. Cl.² .............. C09B 27/00; D06P 1/02
[52] U.S. Cl. .............................. 8/44; 8/82; 8/93; 8/173
[58] Field of Search ............ 8/44, 93 A, 93, 173, 8/44, 93, 173

[56] References Cited

U.S. PATENT DOCUMENTS

| | | | |
|---|---|---|---|
| 2,138,572 | 11/1938 | Etzelmiller | 8/44 |
| 2,206,611 | 7/1940 | Lantz | 8/46 |
| 2,883,258 | 4/1959 | Spitzer et al. | 8/46 |
| 3,658,456 | 4/1972 | Hertel | 8/44 |

FOREIGN PATENT DOCUMENTS 2,209,478  9/1973  Germany.

OTHER PUBLICATIONS

L. Diserens, "The Chemical Technology of Dyeing and Printing", (Reinhold, New York, 1948), vol. I, p. 408.
L. Diserens, "The Chemical Technology of Dyeing and Printing", (Reinhold, New York, 1951), vol. II, p. 223.

*Primary Examiner*—A. Lionel Clingman
*Attorney, Agent, or Firm*—Connolly and Hutz

[57] ABSTRACT

Highly concentrated solutions of coupling components of the ice-color dyeing technique had been found which possess a very good stability to storage and can readily be used for the preparation of diluted aqueous bottoming baths of the ice-color technique; these novel solutions contain the coupling component, water, sodium-or potassium hydroxide, and are characterized by the imperative content of diethylene-glycol or a content of a mixture of diethylene-glycol and ethylene-glycol or propylene-glycol or both.

14 Claims, No Drawings

CONCENTRATED STABLE SOLUTIONS OF COUPLING COMPONENTS FOR THE ICE COLOR DYEING, THEIR PREPARATION AND USE

The present invention relates to concentrated solutions with a good stability to storage of coupling components for the ice color dyeing, their preparation and use.

In the ice color dyeing, arylamides of aromatic or heretocyclic o-hydroxy-carboxylic acids and of acylacetic acids are used as coupling components.

These components are used in alkaline solutions of low concentration. The dissolving of the coupling components involves certain difficulties, however. In aqueous sodium hydroxide solution they can only be dissolved by boiling. If the process is to be carried out at room temperature, they must be premixed to a paste by means of ethyl alcohol and must be dissolved by the addition of an aqueous sodium hydroxide solution and water (cf. Naphthol AS Anwendungsvorschriften of Farbwerke Hoechst AG, No. 4026 that is, Technical Manual for dyeing with naphthol).

For this reason is has long been desirable to obtain preparations (compositions) of these coupling components which yield ready-to-use bottoming baths by merely being poured into a mixture of water and aqueous sodium hydroxide solution.

In U.S. Pat. No. 2,883,258, solutions of determined coupling components have been described which contain ethylene-glycol, water, sodium- or potassium hydroxide and optionally methyl alcohol. In the case of 2-hydroxy-3-naphthoic acid anilide (C.I. 37505), 2-hydroxy-3-naphthoic acid-o-toluidide (C.I. 37520), 2-hydroxy-3-naphthoic acid-o-anisidide (C.I. 37530), 2-hydroxy-3-naphthoic acid-β-naphthylamide (C.I. 37565),
and 2-hydroxy-3-naphthoic acid-o-phenetidide (C.I. 37558), this method yields concentrations of 35 to 40% b. wt. of coupling component; in the case of 2-hydroxy-3-naphthoic acid-m-nitranilide (C.I. 37515) and 4,4'-bis-(acetoacetylamino)-3,3'-di-methyl-diphenyl (C.I. 37610), the concentration is 20% b. wt.

With other coupling components which are not mentioned in this Patent Specification (cf. Colour Index, 3rd edition, 1971, volume 4, C.I. 37510 – 37625), only solutions of a lower concentration can be prepared with said mixtures of ethylene-glycol, water, sodium- or potassium hydroxide and methanol. However, for reasons related to price, transport and waste water, the most desirable solutions of coupling components are those whose concentrations are as high as possible. This lack had been overcome by the instant invention.

We have now found that concentrated solutions of coupling components of the ice color series which are fast to storage and which contain one or several, such as 1, 2 or 3, preferably 1 or 2, especially one, arylamides of an aromatic or heretorcyclic o-hydroxy-carboxylic acid or an acylacetic acid as coupling component, water and sodium- or potassium hydroxide, are obtained of they contain diethylene-glycol and optionally ethylene- and-/or propylene-glycol.

As coupling components there may be mentioned in particular those listed in Colour Index, 3rd edition (1971), under C.I. Nos. 37505 to 37625.

A heating of the bottoming baths or a preparation of so-called stock solutions is no longer necessary.

The preparation of the solutions may be effected by simply stirring the coupling components with water, sodium- or potassium hydroxide solution and diethylene-glycol ($HOCH_2CH_2OCH_2CH_2OH$) and optionally ethylene-glycol ($HOCH_2CH_2OH$) and/or propylene-glycol ($CH_3CH(OH)CH_2OH$) at room temperature.

The novel solutions according to the invention advantageously contain or consist of about 30 to 50% by weight in particular 35 to 50% by weight, of a coupling component, about 5 to 30% by weight of water, about 2.5 to 10% of sodium- or potassium hydroxide or a mixture thereof, as well as about 25 to 60% by weight, preferably 25 to 45% by weight, of diethylene-glycol, or about 7 to 45% by weight of diethylene-glycol and 10 to 30% by weight of ethylene and/or propylene-glycol.

Of these, there are to be mentioned in particular those solutions which contain as coupling component a compound of the formula

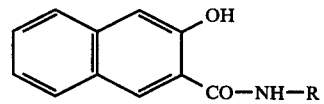

in which R is phenyl which may be substituted by 1 to 3 substituents selected from the group consisting of halogen, such as chlorine, methyl, ethyl, methoxy and ethoxy.

If mixtures of diethylene-glycol and ethylene- and/or propylene-glycol are used, the optimum ratio depends on the nature of the coupling component and has to be terminated by tests. The same is true for the amount of water used. The sodium- and/or potassium hydroxide is used in a ratio of 0.95 to 1.5 moles per mole of coupling cupling component and per coupling spot, preferably in the ratio of 0.97 to 1.15, especially of 0.97 to 1.10 moles per mole of coupling component and per coupling spot.

Accordingly, special embodiments of the present invention are those solutions which contain or consists essentially of about 30 to 50% by weight of a coupling component, of an amount of sodium- or potassium hydroxide or a mixture of both hydroxides which is about 0.97 to 1.15 or especially to 1.10 times equivalent, calculated on the coupling component and coupling spot, of about 5 to 30% by weight of water, as well as about 25 to 60% by weight of diethylene-glycol or about 7 to 45% by weight of diethylene-glycol and 10 to 30% by weight of ethylene- and/or propylene-glycol.

Further special embodiments of the present invention are solutions of the following compositions:

Solutions which contain or consist essentially of about 30 to 50% by weight of a coupling component of the formula

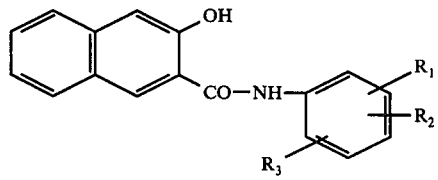

in which $R_1$, $R_2$ and $R_3$ are the same or different and $R_1$ stands for hydrogen, methyl, methoxy or ethoxy, $R_2$ stands for hydrogen, methoxy or ethoxy, and $R_3$ is a hydrogen atom or — if $R_1$ is methyl- may also represent methoxy or ethoxy, of about 5 to 30% by weight of water, of about 2.5 to 10% by weight of sodium- or potassium hydroxide or a mixture thereof, but preferably of an amount of sodium- or potassium hydroxide or a mixture thereof which is about 0.97 to 1.15, especially to 1.10 times equivalent calculated on the coupling component and per coupling spot, as well as of about 25 to 40% by weight of diethylene-glycol or a total of about 25 to 40% by weight of diethylene-glycol and ethylene- and/or propylene-glycol in a weight ratio of about 20 to 80 parts of diethylene-glycol to 80 to 20 parts of ethylene- and/or propylene-glycol;

solutions which contain or consist essentialy of about 30 to 50% by weight of a coupling component of the formula

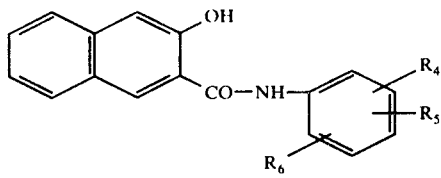

in which $R_4$ and $R_5$ are the same or different and $R_4$ stands for hydrogen, methyl, methoxy or ethoxy, $R_5$ stands for hydrogen, methoxy or ethoxy, and $R_6$ is a chlorine atom or the nitro group, of about 5 to 30% by weight of water, of about 2.5 to 10% by weight of sodium- or potassium hydroxide or a mixture thereof, but preferably of an amount of sodium- or potassium hydroxide or a mixture thereof which is about 0.97 to 1.15, especially to 1.10 times equivalent calculated on the coupling and per coupling spot, as well as about 35 to 60% by weight of diethylene-glycol or a total of about 35 to 60% by weight of diethylene-glycol and ethylene- and/or propylene-glycol in a weight ratio of about 20 to 80 parts of diethylene-glycol to 80 to 20 parts of ethylene- and/or propylene-glycol;

solutions which contain or consist essentially of about 30 to 45% by weight of a heterocyclic coupling component of the formula

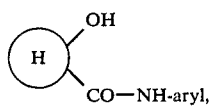

in which Ⓗ is the heterocyclic radical, "aryl" represents an aryl radical and the hydroxy group is in o-position to the carbonamide group, of about 5 to 30% by weight of water, of about 2.5 to 10% by weight of sodium- or potassium hydroxide or a mixture thereof, but preferably of an amount of sodium- or potassium hydroxide or a mixture thereof which is about 0.97 to 1.15, especially to 1.10 times equivalent, calculated on the coupling component and per coupling spot, as well as of about 35 to 60% by weight of diethylene-glycol or a total of about 35 to 60% by weight of diethylene-glycol and ethylene- and/or propylene-glycol in a weight ratio of about 20 to 80 parts of diethylene-glycol to 80 to 20 parts of ethylene- and/or propylene-glycol;

furthermore, particularly solutions according to Examples 1, 2, 3, 15 and 21, the proportions of the individual components optionally showing a deviation of up to about ± 10%.

The solutions of the invention have a very good fastness to storage. They do not show any signs of crystallization, even at changing temperatures or after a longer storage at 0° C. When poured into water to which a small amount of sodium hydroxide solution has been added, they yield immediately ready-to-use bottoming baths.

Compared with the solutions known from U.S. Pat. No. 2,883,258, the novel solutions have the advantage of a higher concentration and a partially better fastness to storage.

The following Examples serve to illustrate the invention, the parts being parts by weight.

EXAMPLE 1

450 Parts of 2-hydroxy-3-naphthoic acid-anilide (C.I. No. 37510) were introduced, while stirring, into a mixture consisting of 250 parts of ethylene-glycol, 73 parts of diethylene-glycol, 212 parts of 33% sodium hydroxide solution and 28 parts of water. The mixture was continued to be stirred for about 30 minutes, until everything was dissolved, and a solution was obtained which was fast to storage and contained 45% by weight of 2-hydroxy-3-naphthoic acid-anilide.

In the following, further solutions of the invention have been described which were obtained in the same manner as has been indicated in the above Example, and which represent also dyeing compositions according to the instant invention of an excellent fasteness to storage:

EXAMPLE 2

45.0 Parts of 2-hydroxy-3-naphthoic acid -2'-methoxyanilide (C.I. No. 37530)
15.0 parts of ethylene-glycol
10.0 parts of diethylene-glycol
6.3 parts of sodium hydroxide 100%
23.7 parts of water

EXAMPLE 3

45.0 Parts of 2-hydroxy-3-naphthoic acid-2'-methylanilide (C.I. No. 37520)
13.0 parts of ethylene-glycol
12.0 parts of diethylene-glycol
10.0 parts of potassium hydroxide 100%
20.0 parts of water.

EXAMPLE 4

45.0 Parts of 2-hydroxy-3-naphthoic acid-4'-methoxy-2'-methylanilide (C.I. No. 37540)
30.0 parts of diethylene-glycol
8.7 parts of potassium hydroxide 100%
16.3 parts of water.

EXAMPLE 5

45.0 Parts of 2-hydroxy-3-naphthoic acid-2'-ethoxyanilide (C.I. No. 37558)
33.0 parts of diethylene-glycol
8.6 parts of potassium hydroxide 100%
13.4 parts of water.

EXAMPLE 6

40.0 Parts of 2hydroxy-3-naphthoic acid-4'-methoxyanilide (C.I. No. 37535)
30.0 parts of ethylene-glycol
10.0 parts of diethylene-glycol
8.0 parts of potassium hydroxide 100%
12.0 parts of water.

EXAMPLE 7

40.0 Parts of 2-hydroxy-3-naphthoic acid -4'-ethoxyanilide (C.I. No. 37559)
30.0 parts of diethylene-glycol
7.7 parts of potassium hydroxide 100%
22.3 parts of water.

EXAMPLE 8

44.0 parts of 3-hydroxy-diphenylene oxide-2-carboxylic acid-2'-ethoxyanilide
35.0 parts of diethylene-glycol
5.3 parts of sodium hydroxide
15.3 parts of water.

EXAMPLE 9

40.0 parts of 2-hydroxy-3-naphthoic acid-4'-chloro-2'-methylanilide (C.I. No. 37525)
40.0 parts of diethylene-glycol
7.6 parts of potassium hydroxide 100%
12.4 parts of water.

EXAMPLE 10

40.0 Parts of 2-hydroxy-3-naphthoic acid-5'-chloro-2'-methoxyanilide (C.I. No. 37531)
20.0 parts of ethylene-glycol
20.0 parts of diethylene-glycol
5.2 parts of sodium hydroxide 100%
14.8 parts of water.

EXAMPLE 11

40.0 Parts of 2-hydroxy-3-naphthoic acid-1'-naphthylamide (C.I. No. 37560)
5.0 parts of ethylene-glycol
35.0 parts of diethylene-glycol
5.6 parts of sodium hydroxide 100%
14.4 parts of water.

EXAMPLE 12

44.0 Parts of 3-hydroxy-diphenylene oxide-2-carboxylic acid-2'-ethoxyanilide
20.0 parts of ethylene-glycol
21.2 parts of diethylene-glycol
7.3 parts of potassium hydroxide
7.5 parts of water.

EXAMPLE 13

40.0 Parts of 2-hydroxy-3-naphthoic acid-4'-chloro-5'-methyl-2'-methoxyanilide (C.I. No. 37541)
10.0 parts of propylene-glycol
30.0 parts of diethylene-glycol
5.0 parts of sodium hydroxide 100%
15.0 parts of water.

EXAMPLE 14

44.0 Parts of 3-hydroxy-diphenylene oxide-2-carboxylic acid-2'-ethoxyanilide
41.2 parts of diethylene-glycol
7.3 parts of potassium hydroxide
7.5 parts of water.

EXAMPLE 15

30.0 Parts of 2-hydroxy-benzocarbazole-3-carboxylic acid-4'-methoxy-anilide (C.I. No. 37595)
15.0 parts of ethylene-glycol
35.0 parts of diethylene-glycol
4.0 parts of sodium hydroxide 100%
16.0 parts of water.

EXAMPLE 16

30.0 Parts of 2-hydroxybenzocarbazole-3-carboxylic acid-4'-methoxy-2'-methylanilide (C.I. 37590)
15.0 parts of ethylene-glycol
44.4 parts of diethylene-glycol
3.5 parts of sodium hydroxide 100%
7.1 parts of water.

EXAMPLE 17

30.0 Parts of 4.4'-bis-(acetoacetylamino)-3,3'-dimethyl-diphenyl (C.I. No. 37610)
40.0 parts of diethylene-glycol
7.0 parts of sodium hydroxide 100%
23.0 parts of water.

EXAMPLE 18

44.0 Parts of 3-hydroxy-diphenylene oxide-2-carboxylic acid-2'-ethoxyanilide
17.0 parts of ethylene-glycol
18.0 parts of diethylene-glycol
7.3 parts of potassium hydroxide
13.7 parts of water.

EXAMPLE 19

15.0 Parts of 2-hydroxybenzocarbazole-3-carboxylic acid-4'-methoxy-anilide (C.I. No. 37595)
15.0 parts of 2-hydroxybenzocarbazole-3-carboxylic acid-4'-methoxy-2'-methylanilide (C.I. No. 37590)
37.0 parts of ethylene-glycol
20.0 parts of diethylene-glycol
3.5 parts of sodium hydroxide
9.5 parts of water.

EXAMPLE 20

45.0 Parts of 2-hydroxy-6-methoxy-naphthoic acid-2'-methyl-anilide (C.I. No. 37568)
20.0 parts of ethylene-glycol
10.0 parts of diethylene-glycol
8.7 parts of potassium hydroxide
16.3 parts of water.

EXAMPLE 21

45.0 Parts of 2-hydroxy-3-naphthoic acid anilide (C.I. No. 37510)
34.0 parts of diethylene-glycol
10.0 parts of potassium hydroxide
11.0 parts of water.

EXAMPLE 22

45.0 Parts of 2-hydroxy-3-naphthoic acid-2'-methoxyanilide (C.I. No. 37530)
13.0 parts of ethylene-glycol
20.0 parts of diethylene-glycol
6.3 parts of sodium hydroxide
15.7 parts of water.

EXAMPLE 23

45.0 Parts of 2-hydroxy-3-naphthoic acid-2'-methoxyanilide
25.0 parts of diethylene-glycol
6.3 parts of sodium hydroxide
23.7 parts of water.

EXAMPLE 24

45.0 Parts of 2-hydroxy-3-naphthoic acid-2'-methylanilide (C.I. No. 37520)
20.0 parts of ethylene-glycol 10.0 parts of diethylene-glycol
10.0 parts of potassium hydroxide
15.0 parts of water.

EXAMPLE 25

40.0 Parts of 2-hydroxy-3-naphthoic acid-2'-methylanilide (C.I. No. 37520)
15.0 parts of ethylene-glycol
25.0 parts of diethylene-glycol
6.3 parts of sodium hydroxide
13.7 parts by water.

EXAMPLE 26

40.0 Parts of 2-hydroxy-3-naphthoic acid-2'-methylanilide (C.I. No. 37520)
40.0 parts of diethylene-glycol
6.3 parts of sodium hydroxide
13.7 parts of water.

EXAMPLE 27

45.0 Parts of 2-hydroxy-3-naphthoic acid-4'-methoxy-2'-methylanilide (C.I. No. 37540)
15.0 parts of ethylene-glycol
15.0 parts of diethylene-glycol
8.7 parts of potassium hydroxide
16.3 parts of water.

EXAMPLE 28

45.0 Parts of 2-hydroxy-3-naphthoic acid-4'-methoxy-2'-methylanilide (C.I. No. 37540)
20.0 parts of diethylene-glycol
8.7 parts of potassium hydroxide
26.3 parts of water.

EXAMPLE 29

45.0 Parts of 2-hydroxy-3-naphthoic acid-2'-ethoxyanilide (C.I. No. 37558)
10.0 parts of ethylene-glycol
27.0 parts of diethylene-glycol
8.6 parts of potassium hydroxide
9.4 parts of water.

EXAMPLE 30

40.0 Parts of 2-hydroxy-3-naphthoic acid-4'-methoxyanilide (C.I. No. 37535)
25.0 parts of ethylene-glycol
10.0 parts of diethylene-glycol
8.0 parts of potassium hydroxide
16.0 parts of water.

EXAMPLE 31

40.0 Parts of 2-hydroxy-3-naphthoic acid-4'-ethoxyanilide (C.I. No. 37559)
17.0 parts of ethylene-glycol
18.0 parts of diethylene-glycol
7.7 parts of potassium hydroxide
17.3 parts of water.

EXAMPLE 32

40.0 Parts of 2-hydroxy-3-naphthoic acid-4'-chloro-2'-methylanilide (C.I. No. 37525)
15.0 parts of ethylene-glycol
29.0 parts of diethylene-glycol
7.6 parts of potassium hydroxide
8.4 parts of water.

EXAMPLE 33

40.0 Parts of 2-hydroxy-3-naphthoic acid-5'-chloro-2'-methoxyanilide (C.I. No. 37531)
10.0 parts of ethylene-glycol
35.0 parts of diethylene-glycol
5.2 parts of sodium hydroxide
9.8 parts of water.

EXAMPLE 34

40.0 Parts of 2-hydroxy-3-naphthoic acid-5'-chloro-2'-methoxyanilide (C.I. No. 37531)
45.0 parts of diethylene-glycol
7.3 parts of potassium hydroxide
7.7 parts of water.

EXAMPLE 35

40.0 Parts of 2-hydroxy-3-naphthoic acid-1'-naphthylamide (C.I. No. 37560)
20.0 parts of ethylene-glycol
24.0 parts of diethylene-glycol
5.6 parts of sodium hydroxide
10.4 parts of water.

EXAMPLE 36

40.0 Parts of 2-hydroxy-3-naphthoic acid-1'-naphthylamide (C.I. No. 37560)
44.0 parts of diethylene-glycol
7.6 parts of potassium hydroxide
8.4 parts of water.

EXAMPLE 37

40.0 Parts of 2-hydroxy-3-naphthoic acid-1'-naphthylamide (C.I. No. 37560)
15.0 parts of ethylene-glycol
25.0 parts of diethylene-glycol
7.6 parts of potassium hydroxide
12.4 parts of water.

EXAMPLE 38

30.0 Parts of 2-hydroxy-3-naphthoic acid-3'-nitroanilide (C.I. No. 37515)
40.0 parts of ethylene-glycol
20.0 parts of diethylene-glycol
4.2 parts of sodium hydroxide
5.8 parts of water.

EXAMPLE 39

30.0 Parts of 2-hydroxy-3-naphthoic acid-3'-nitroanilide (C.I. No. 37515)
30.0 parts of ethylene-glycol
30.0 parts of diethylene-glycol
4.2 parts of sodium hydroxide
5.8 parts of water.

EXAMPLE 40

40.0 Parts of 2-hydroxy-3-naphthoic acid-4'-chloro-5'-methyl-2'-methoxyanilide (C.I. No. 37541)
10.0 parts of ethylene-glycol
30.0 parts of diethylene-glycol
5.0 parts of sodium hydroxide
15.0 parts of water.

EXAMPLE 41

40.0 Parts of 2-hydroxy-3-naphthoic acid-4'-chloro-5'-methyl-2'-methoxyanilide (C.I. No. 37541)
35.0 parts of diethylene-glycol
5.0 parts of sodium hydroxide 20.0 parts of water.

EXAMPLE 42

40.0 Parts of 2-hydroxy-3-naphthoic acid-3'-methoxy-diphenylene oxide-2'-amide (C.I. No. 37580)
20.0 parts of ethylene-glycol
20.0 parts of diethylene-glycol
4.2 parts of sodium hydroxide
15.8 parts of water.

EXAMPLE 43

40.0 Parts of 2-hydroxy-3-naphthoic acid-3'-methoxy-diphenylene oxide-2'-amide (C.I. No. 37580)
40.0 parts of diethylene-glycol
4.2 parts of sodium hydroxide
15.8 parts of water.

EXAMPLE 44

40.0 Parts of 2-hydroxy-3-naphthoic acid-3'-methoxy-diphenylene oxide-2'-amide (C.I. No. 37580)
47.0 parts of diethylene-glycol
6.2 parts of potassium hdyroxide
6.8 parts of water.

EXAMPLE 45

30.0 Parts of 2-hyroxy-benzocarbazol-3-carboxylic acid-4'-methoxyanilide (C.I. No. 37595)
50.0 parts of diethylene-glycol
4.0 parts of sodium hydroxide
16.0 parts of water.

EXAMPLE 46

30.0 Parts of 2-hydroxy-benzocarbazol-3-carboxylic acid-4'-methoxy-2'-methylanilide (C.I. No. 37590)
59.4 parts of diethylene-glycol
3.5 parts of sodium hydroxide
7.1 parts of water.

EXAMPLE 47

30.0 Parts of 4,4'-bis-(aceto-acetylamino)-3,3'-dimethyl-diphenyl (C.I. No. 37610)
20.0 parts of ethylene-glycol
20.0 parts of diethylene-glycol
7.0 parts of sodium hydroxide
23.0 parts of water.

EXAMPLE 48

40.0 Parts of 3-hydroxy-diphenylene oxide-2-carboxylic acid-2',5'-dimethoxy-anilide (C.I. No. 37605)
20.0 parts of ethylene-glycol
26.5 parts of diethylene-glycol
4.6 parts of sodium hydroxide
8.9 parts of water.

EXAMPLE 49

40.0 Parts of 3-hydroxy-diphenylene oxide-2-carboxylic acid-2', 5'-dimethoxyanilide (C.I. No. 37605)
46.5 parts of diethylene-glycol
4.6 parts of sodium hydroxide
8.9 parts of water.

EXAMPLE 50

40.0 Parts of 3-hydroxy-diphenylene oxide-2-carboxylic acid-2',5'-dimethoxyanilide (C.I. 37605)
20.0 parts of ethylene-glycol
26.4 parts of diethylene-glycol
6.5 parts of potassium hydroxide
7.1 parts of water.

EXAMPLE 51

40.0 Parts of 3-hydroxy-diphenylene oxide-2-carboxylic acid-2',5'-dimethoxyanilide (C.I. No. 37605)
46.4 parts of diethylene-glycol
6.5 parts of potassium hydroxide
7.1 parts of water.

EXAMPLE 52

40.0 Parts of 3-hydroxy-diphenylene oxide-2-carboxylic acid-2',5'-dimethoxyanilide (C.I. No. 37605)
40.0 parts of diethylene-glycol
6.5 parts of potassium hydroxide
13.5 parts of water.

EXAMPLE 53

44.0 Parts of 3-hydroxy-diphenylene oxide-2-carboxylic acid-2'-ethoxyanilide
20.0 parts of ethylene-glycol
20.4 parts of diethylene-glycol
5.3 parts of sodium hydroxide
10.3 parts of water.

EXAMPLE 54

44.0 Parts of 3-hydroxy-diphenylene oxide-2-carboxylic acid-2'-ethoxyanilide
40.4 parts of diethylene-glycol
5.3 parts of sodium hydroxide
10.3 parts of water.

APPLICATION EXAMPLE 1

Preparation of a bottoming bath for the continuous dyeing

940 Parts of softened water having room temperature were mixed with 13 parts by volume of an aqueous 32.5% sodium hydroxide solution and 5 parts by weight of a fatty acid-protein degradation product-condensate. Subsequently 40 parts by weight of a solution of 2-hydroxy-3-naphthoic acid-anilide prepared according to Example 1, were introduced by stirring. A yellow solution was obtained which was immediately ready-for-use.

APPLICATION EXAMPLE 2

Preparation of a bottoming bath for the batchwise exhaustion dyeing

990 Parts of softened water having room temperature were mixed, while stirring, with 6 parts by volume of an aqueous 32.5% sodium hydroxide solution and 2 parts by weight of a formaldehyde-naphthaline-sulfonic acid-condensation product. Subsequently 4.4 parts by weight of a solution of 2-hydroxy-3-naphthoic acid-(4'-chloro-2'-methoxy-5'-methyl-phenylamide) prepared according to Example 13, was introduced by stirring. The yellow solution obtained was immediately ready-for-use. It was applied in a goods-to-liquor ratio of 1:20.

We claim:

1. A concentrated stable solution of a coupling component for ice color dyeing comprising one or several arylamides selected from the group consisting essentially of arylamides of an aromatic or heterocyclic o-hydroxycarboxylic acid and of arylamides of an acyl-acetic acid, water, sodium hydroxide or potassium hydroxide or both, and diethylene glycol.

2. A solution according to claim 1 containing additionally ethylene- or propylene-glycol or a mixture thereof.

3. A solution according to claim 1, containing or consisting essentially of about 30 to 50% by weight of a coupling component of about 2.5 to 10% by weight of sodium- or potassium hydroxide or a mixture thereof, of about 5 to 30% by weight of water and of about 25 to 60% by weight of diethylene-glycol or of a mixture of about 7 to 45% by weight of diethylene-glycol and 10 to 30% by weight of ethylene- or propylene-gylcol or both.

4. A solution according to claim 3, wherein the coupling component is a compound of the formula

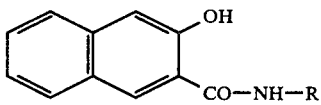

in which R is a phenyl unsubstituted or substituted by substituents selected from the group consisting of halogen, methyl, ethyl, methoxy and ethoxy.

5. A solution according to claim 3, containing about 30 to 50% by weight of a coupling component, an amount of sodium- or potassium hydroxide or both which is about 0.97 to 1.15 times equivalent, calculated on the coupling component and per coupling spot, about 5 to 30% by weight of water and about 25 to 60% by weight of diethylene-glycol or a mixture of about 7 to 45% by weight of diethylene-glycol and 10 to 30% by weight of ethylene- or propylene-glycol or both.

6. A solution according to claim 5, wherein the coupling component is a compound of the formula

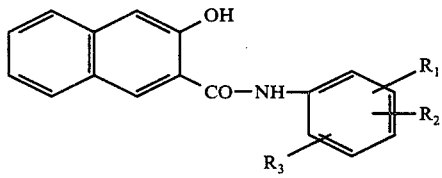

in which $R_1$, $R_2$ and $R_3$ are the same or different and $R_1$ is hydrogen, methyl, methoxy or ethoxy, $R_2$ is hydrogen, methoxy or ethoxy and $R_3$ is hydrogen, or — if $R_1$ is methyl — is hydrogen, methoxy or ethoxy, and the portion of the solvent is about 25 to 40% by weight of diethyklene-glycol or a total of about 25 to 40% by weight of diethylene-glycol and ethylene- and/or propylene-glycol in a weight ratio of about 20 to 80 parts of diethylene-glycol to 80 to 20 parts of ethylene- or propylene-glycol or both.

7. A solution according to claim 5, wherein the coupling component is a compound of the formula

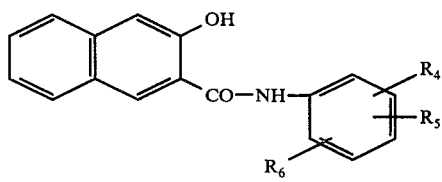

in which $R_4$ and $R_5$ are the same or different and $R_4$ is hydrogen, methyl, methoxy or ethoxy, $R_5$ is hydrogen, methoxy or ethoxy, and $R_6$ is chlorine or nitro, and the portion of the solvent is about 35 to 60% by weight of diethylene-glycol or a total of about 35 to 60% by weight of diethylene-glycol and ethylene- and/or propylene-glycol in a weight ratio of about 20 to 80 parts of diethylene-glycol to 80 to 20 parts of ethylene- or propylene-glycol or both.

8. A solution according to claim 5, wherein the coupling component is a heterocyclic coupling component of the formula

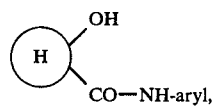

in which Ⓗ is the heterocyclic radical, "aryl" is an aryl radical and the hydroxy group is in o-position to the carbonamide group, and the portion of the solvent is about 35 to 60% by weight of diethylene-glycol or a total of about 35 to 60% by weight of diethylene-glycol and ethylene- and/or propylene-glycol in a weight ratio of about 20 to 80 parts of diethylene-glycol to 80 to 20 parts of ethylene- or propylene-glycol or both.

9. A solution according to claim 1 which contains or consists essentially of about 42 to 47% by weight of b 2-hydroxy-3-naphthoic acid-anilide, of about 6.5 to 7.5% by weight of sodium hydroxide, of about 16 to 18% by weight of water, of about 20 to 30% by weight of ethylene-glycol and 7 to 10% by weight of diethylene-glycol.

10. A solution as claimed in claim 1 which contains or consists essentially of about 42 to 47% by weight of 2-hydroxy-3-naphthoic acid-2-methoxy-anilide, about 6 to 7% by weight of sodium hydroxide, about 22 to 25% by weight of water, about 12 to 18% by weight of ethylene-glycol and about 10 to 15% by weight of diethylene-glycol.

11. A solution as claimed in claim 1 which contains or consists essentially of about 42 to 47% by weight of 2-hydroxy-3-naphthoic acid-2'-methylanilide, about 9.5 to 11% by weight of potassium hydroxide, about 18 to 22% by weight of water, about 11 to 14% by weight of diethylene-glycol and about 10 to 15% by weight of ethylene-glycol.

12. A solution as claimed in claim 1 which contains or consists essentially of about 30 to 33% by weight of 2-hydroxy-benzocarbaxol-3-carboxylic acid-4'-methoxy-analike, about 4 to 5% by weight of sodium hydroxide, about 14 to 18% by weight of water, about 30 to 40% by weight of diethylene-glycol and about 12 to 18% by weight of ethylene-glycol.

13. A solution as claimd in claim 1 which contains or consists essentially of about 42 to 47% by weight of 2-hydroxy-3-naphthoic acid-anilide, about 9 to 12% by weight of potassium hydroxide, about 9 to 12% by weight of water and about 32 to 37% by weight of diethylene-glycol.

14. Process of preparing a bottoming bath for ice color dyeing, in which process the solution of claim 1 is employed.

* * * * *